(12) United States Patent
Sakamoto et al.

(10) Patent No.: US 7,633,257 B2
(45) Date of Patent: Dec. 15, 2009

(54) ACTIVE VIBRATION CONTROL SYSTEM FOR HYBRID VEHICLE

(75) Inventors: Kosuke Sakamoto, Utsunomiya (JP); Toshio Inoue, Tochigi-ken (JP); Akira Takahashi, Tochigi-ken (JP); Yasunori Kobayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 299 days.

(21) Appl. No.: 11/715,849

(22) Filed: Mar. 9, 2007

(65) Prior Publication Data

US 2007/0222407 A1    Sep. 27, 2007

(30) Foreign Application Priority Data

Mar. 23, 2006    (JP) .............................. 2006-080357

(51) Int. Cl.
G05B 5/01    (2006.01)

(52) U.S. Cl. ........................................ 318/611; 701/22

(58) Field of Classification Search ................. 318/611; 701/22

See application file for complete search history.

(56) References Cited

U.S. PATENT DOCUMENTS

| | | | |
|---|---|---|---|
| 5,515,720 A * | 5/1996 | Remboski et al. ........ 73/114.05 |
| 5,638,305 A * | 6/1997 | Kobayashi et al. .......... 700/280 |
| 6,023,651 A * | 2/2000 | Nakayama et al. ........... 701/110 |
| 6,286,473 B1 * | 9/2001 | Zaremba ................... 123/192.1 |
| 6,621,244 B1 * | 9/2003 | Kiyomiya et al. ............ 318/611 |
| 6,641,501 B2 | 11/2003 | Kitajima et al. |
| 6,907,325 B1 * | 6/2005 | Syed et al. ..................... 701/22 |
| 6,950,727 B2 * | 9/2005 | Ichikawa ..................... 700/280 |
| 7,110,867 B2 * | 9/2006 | Imazu ........................... 701/22 |
| 7,226,082 B2 * | 6/2007 | Muramatsu et al. .......... 280/775 |

FOREIGN PATENT DOCUMENTS

| | | |
|---|---|---|
| JP | 59-122754 | 7/1984 |
| JP | 61-135936 A | 6/1986 |
| JP | 4-24538 B2 | 4/1992 |
| JP | 07-223444 A | 8/1995 |
| JP | 10-122029 A | 12/1998 |
| JP | 2002-291105 A | 10/2002 |

* cited by examiner

Primary Examiner—Bentsu Ro
Assistant Examiner—David S Luo
(74) Attorney, Agent, or Firm—Arent Fox LLP

(57) ABSTRACT

In a motor-assisted hybrid vehicle, an active vibration control system suppresses torque fluctuations of an engine without detriment to the response of a static torque. An adaptive notch filter outputs a control signal depending on a harmonic basic signal generated by a basic signal generator from a rotational frequency of a crankshaft. A combiner combines the control signal with a drive signal for the generator motor and supplies the combined signal through a power controller to the generator motor. The basic signal is supplied to corrective filters having the transfer function of the generator motor to output a reference signal. The filter coefficient of an adaptive notch filter is successively updated so that an error signal representative of a rotational speed fluctuation of the crankshaft will be minimized.

5 Claims, 3 Drawing Sheets

100
ACTIVE VIBRATION CONTROL SYSTEM FOR HYBRID VEHICLE

BACKGROUND OF THE INVENTION

1. Field of the Invention

The present invention relates to an active vibration control system for use in a motor-assisted hybrid vehicle having a generator motor integrally combined with an engine serving as a propulsive source for propelling the hybrid vehicle, the generator motor being used, when operating in a motor mode, as an assistive propulsive source for assisting the output power of the engine.

2. Description of the Related Art

Generally, engines on vehicles operate by converting the power of the intermittent explosions in the cylinders to the rotation of the crankshaft (output shaft) and outputting the rotary torque of the crankshaft. Therefore, the rotary torque inevitably fluctuates in synchronism with the intermittent explosions. There has been proposed a torque fluctuation suppressing apparatus for suppressing the rotary torque fluctuations by detecting an increase in the rotary torque generated by the crankshaft, supplying a field current to a generator motor that is coupled to the crankshaft in torque transmitting and receiving relation thereto, and applying an inverse torque from the generator motor to the crankshaft when the rotary torque generated by the crankshaft increases. For details, reference should be made to Japanese Patent Publication No. 4-24538 and Japanese Laid-Open Patent Publication No. 61-135936.

The conventional torque fluctuation suppressing apparatus generates the inverse torque by controlling the generator motor in a feed-forward control mode based on engine rotational speed fluctuations detected by a crankangle sensor. Therefore, if the engine ignition timing varies due to a change in the intake temperature, then the torque fluctuation suppressing apparatus fails to perform its control process properly and tends to lower its vibration reducing performance.

The conventional torque fluctuation suppressing apparatus determines vibration control data at the time the accelerator pedal is depressed to a certain depth for a constant throttle valve opening. Consequently, when the accelerator pedal is depressed to a different depth to change the throttle valve opening, the vibration control capability of the torque fluctuation suppressing apparatus is greatly lowered.

SUMMARY OF THE INVENTION

It is an object of the present invention to provide an active vibration control system for use in a motor-assisted hybrid vehicle having a generator motor used as an assistive propulsive source for assisting the output power of the engine on the hybrid vehicle, the active vibration control system being capable of controlling vibrations by suppressing torque fluctuations of the crankshaft of the engine in quick response to the torque fluctuations without detriment to the response of the static torque from the assistive generator motor.

According to the present invention, there is provided an active vibration control system for use in a hybrid vehicle having a generator motor for assisting an engine in rotating a crankshaft thereof, comprising a basic signal generator for generating a harmonic basic signal from a rotational frequency of the crankshaft, an adaptive notch filter for being supplied with the basic signal and outputting a control signal, a combiner for combining the control signal and a drive signal for the generator motor with each other and supplying a combined signal to the generator motor, an error signal detector for detecting a rotational speed fluctuation of the crankshaft and outputting an error signal representative of the detected rotational speed fluctuation, a corrective filter for being supplied with the basic signal and outputting a reference signal, the corrective filter having a transfer function of the generator motor, and filter coefficient updating means for being supplied with the error signal and the reference signal and successively updating a filter coefficient of the adaptive notch filter so that the error signal will be minimized.

With the above arrangement, the adaptive notch filter outputs the control signal depending on the harmonic basic signal which is generated from the rotational frequency of the crankshaft by the basic signal generator, and the combiner combines the control signal and the drive signal (a signal for applying a static torque) for the generator motor with each other and supplies the combined signal through to the generator motor. Furthermore, the basic signal is supplied to the corrective filter having the transfer function of the generator motor, and the corrective filter outputs the reference signal to the filter coefficient updating means. Based on the error signal representative of a rotational speed fluctuation of the crankshaft which is detected by the error signal detector, and the reference signal, the filter coefficient updating means successively updates the filter coefficient of the adaptive notch filter to minimize the error signal Therefore, in the motor-assisted hybrid vehicle which uses the generator motor as an assistive propulsive source to assist the output power of the engine when it operates in a motor mode, the active vibration control system is capable of suppressing a torque fluctuation of the crankshaft in quick response to the torque fluctuation without detriment to the response of the motor-assisted static torque. Accordingly, the same level of vibration control can be achieved both when the accelerator pedal is depressed to a certain depth to achieve a constant throttle valve opening and when the accelerator pedal is depressed to varying depths to achieve varying throttle valve openings.

According to the present invention, in the motor-assisted hybrid vehicle which uses the generator motor as an assistive propulsive source to assist the output power of the engine when it operates in a motor mode, the active vibration control system is capable of suppressing a torque fluctuation of the crankshaft in quick response to the torque fluctuation without detriment to the response of the motor-assisted static torque. Accordingly, the same level of vibration control can be achieved both when the accelerator pedal is depressed to a certain depth to achieve a constant throttle valve opening and when the accelerator pedal is depressed to varying depths to achieve varying throttle valve openings.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Embodiments of the present invention will be described below with reference to the drawings.

Figure 1:
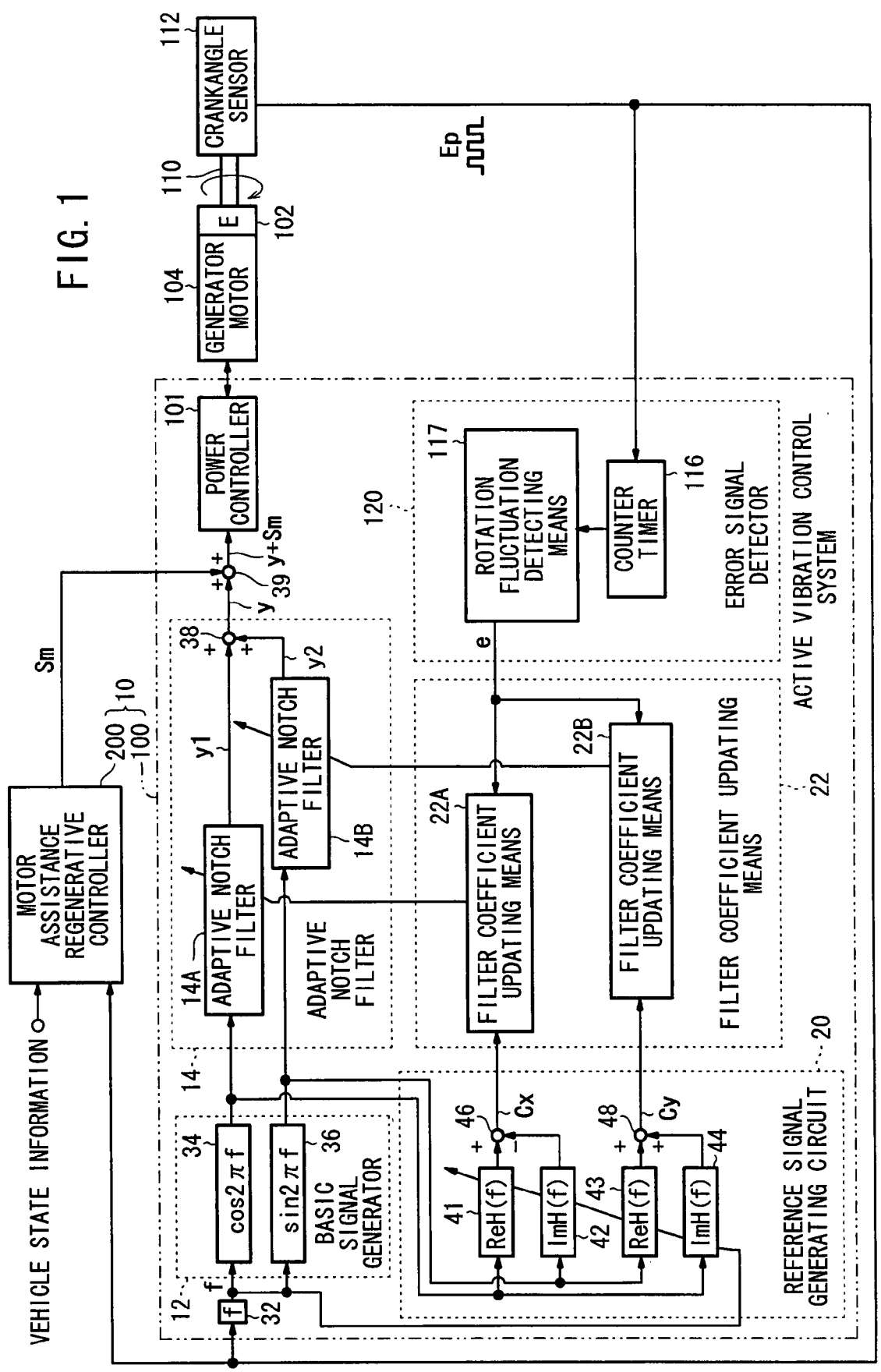
FIG. 1 is a block diagram of an electric arrangement of a generator motor control apparatus including an active vibration control system according to an embodiment of the present invention.

FIG. 1 shows in block form an electric arrangement of a generator motor control apparatus 10 including an active vibration control system 100 according to an embodiment of the present invention.

The generator motor control apparatus 10 comprises the active vibration control system 100 which is in the form of a microcomputer and a motor assistance regenerative controller 200.

Figure 2:
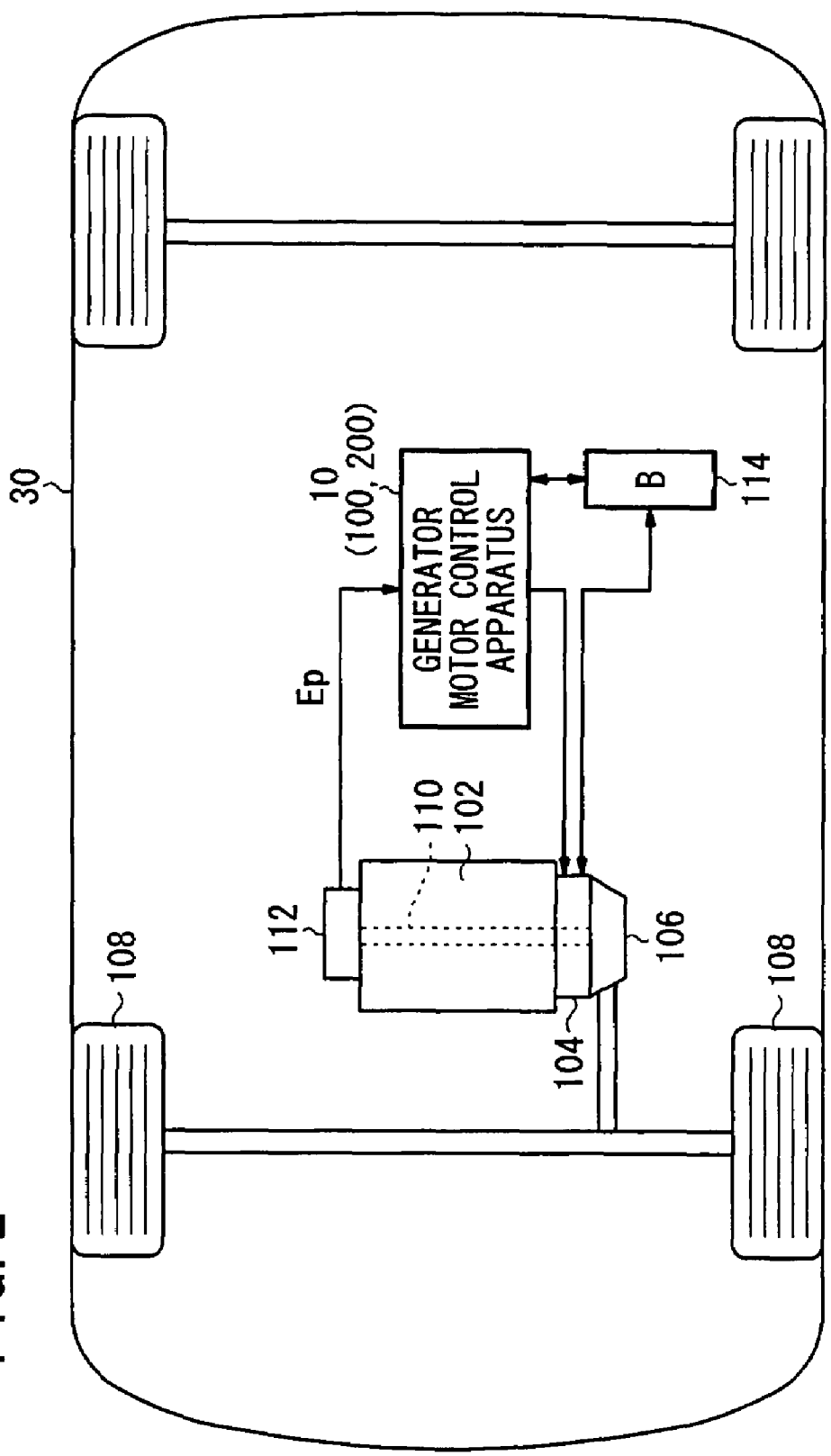
FIG. 2 is a schematic view of a motor-assisted hybrid vehicle incorporating the generator motor control apparatus including the active vibration control system according to the embodiment of the present invention.

FIG. 2 schematically shows a motor-assisted hybrid vehicle 30 incorporating the generator motor control apparatus 10 including the active vibration control system 100 according to the embodiment of the present invention.

As shown in FIG. 2, the motor-assisted hybrid vehicle 30 has an internal combustion engine 102, which may be a diesel engine, a generator motor 104 functioning alternatively as a generator and a motor and integrally coupled to the engine 102, and an automatic or manual transmission 106 integrally coupled to the engine 102. Drive wheels 108 of the motor-assisted hybrid vehicle 30 are rotatable by the output power of the transmission 106.

A battery 114 is connected to the generator motor 104. When the generator motor 104 functions as a motor, the generator motor control apparatus 10 supplies an electric current from the battery 114 to the generator motor 104 to energize the generator motor 104. When the generator motor 104 functions as a generator, the generator motor control apparatus 10 supplies an electric current from the generator motor 104 to the battery 114, charging the battery 114. Therefore, the generator motor control apparatus 10 controls the charging and discharging of the battery 114.

The engine 102 and the generator motor 104 operate in different modes (1) through (6) as follows: (1) When the motor-assisted hybrid vehicle 30 starts moving, the generator motor 104 operates as a motor to generate an amount of motor power greater than the output power produced by the engine 102, and assists the engine 102 with the generated motor power. (2) When the motor-assisted hybrid vehicle 30 cruises at a low speed, it is propelled by only the generator motor 104 operating as a motor with all the cylinders of the engine 102 being disabled. (3) When the motor-assisted hybrid vehicle 30 is slowly accelerated or cruise at a high speed, since the engine 102 has better fuel economy, the generator motor 104 is de-energized and the motor-assisted hybrid vehicle 30 is propelled by only the engine 102. (4) When the motor-assisted hybrid vehicle 30 is quickly accelerated, it is propelled by both the engine 102 and the generator motor 104 operating as a motor. (5) When the motor-assisted hybrid vehicle 30 is decelerated, the engine 102 is turned off and the generator motor 104 operates as a motor to charge the battery 114 in a regenerative mode. (6) When the motor-assisted hybrid vehicle 30 is braked to a stop, both the engine 102 and the generator motor 104 are turned off. When the motor-assisted hybrid vehicle 30 is unbraked, only the engine 102 is started. The active vibration control system 100 performs its process of suppressing torque fluctuations of the engine crankshaft in quick response to the torque fluctuations in the above modes (1), (3), (4), and (6) wherein the engine 102 is in operation.

As shown in FIGS. 1 and 2, a crankangle sensor 112 is attached to a crankshaft (output shaft) 110 of the engine 102, which also serves as the rotational shaft of the generator motor 104. The crankangle sensor 112 outputs 24 crankshaft pulses (engine pulses) EP, for example, per revolution of the crankshaft 110, i.e., one crankshaft pulse per a crankangle of 15°. Therefore, the rotational frequency (rps) of the crankshaft 110 is represented by a value produced when the number of crankshaft pulses Ep per second is divided by 24. Actually, each time a frequency counter (frequency detector) 32 acquires a crankshaft pulse Ep, it detects and outputs an updated crankshaft rotational frequency f.

A fluctuation of the rotational speed of the crankshaft 110 is detected as follows: A fluctuation of the rotational speed of the crankshaft 110 is expressed in angular rate $\omega$ [rad/sec]. A time interval T [sec] between adjacent crankshaft pulses Ep is detected by a counter timer 116. A change in the time interval T is detected as a change in the angular rate $\omega=\{15\times(\pi/180)/T\}$ by a rotation fluctuation detecting means 117. Specifically, such a change in the angular rate $\omega$, which represents a fluctuation of the rotational speed of the crankshaft 110, is calculated by subtracting a previously calculated value of $\omega n$ from a presently calculated value of $\omega n+1$, and dividing the difference by the previously calculated value of $\omega n$. The change in the angular rate $\omega$, which is calculated as $\{(\omega n+1)-\omega n\}/\omega n$, is output as an error e signal from the rotation fluctuation detecting means 117.

The counter timer 116 and the rotation fluctuation detecting means 117 jointly make up an error signal detector 120 which outputs the rotational speed fluctuation $\{(\omega n+1)-\omega n\}/\omega n$ as the error signal e. If a CPU capable of performing faster processing operation can be used as the active vibration control system 100, then crankshaft pulses Ep may be multiplied, and a rotational speed fluctuation may be calculated from pulses at shorter time intervals and output it as an error signal e for better accuracy with which to detect the rotational speed fluctuation.

The active vibration control system 100 basically comprises a basic signal generator 12 for generating a harmonic basic signal (a sine signal and/or a cosine signal) from the rotational frequency f of the crankshaft 110, an adaptive notch filter 14 for being supplied with the basic signal from the basic signal generator 12 and outputting a control signal y(n) representative of an inverse torque for canceling out a rotational speed fluctuation of the crankshaft 110 at time n in each sampling period, a combiner 39 for combining the control signal y(n) and a motor assistance signal (a drive signal for the generator motor 104) Sm(n) representative of a static torque with each other and outputting a combined signal y(n)+Sm(n), a power controller 101 for being supplied with the combined signal y(n)+Sm(n), controlling the rotational speed of the crankshaft 110 and the fluctuation thereof to perform vibration control, and supplying regenerated electric energy to charge the battery 114, an error signal detector 120 (referred to above) for detecting a fluctuation of the rotational speed of the crankshaft 110 which is rotated by the generator motor 104 and the engine 102 based on crankshaft pulses Ep from the crankangle sensor 112, and outputting the rotational speed fluctuation as an error signal e(n), a reference signal generating circuit 20 for being supplied with the basic signal and outputting a reference signal, the reference signal generating circuit 20 having a transfer function H of the generator motor 104, and a filter coefficient updating means (LMS algorithm processor) 22 for being supplied with the error signal e(n) and the reference signal and updating a filter coefficient W(n+1) of the adaptive notch filter 14. The generator motor 104 is controlled by the power controller 101.

The filter coefficient updating means 22 comprises a filter coefficient updating means 22A and a filter coefficient updating means 22B.

The power controller 101 includes a three-phase inverter circuit and a field current supplying and regenerating circuit, and perform revolving-magnetic-field control, field control, and regenerative control on three-phase stator coils and field coils (rotor coils) of the generator motor 104.

The motor assistance regenerative controller 200 of the generator motor control apparatus 10 searches a stored map for a to-be-applied torque (static torque) depending on vehicle state information, such as a throttle valve opening produced by the accelerator pedal, not shown, for example, and outputs a drive signal Sm(n) depending on the to-be-applied torque.

The generator motor control apparatus 10 on the motor-assisted hybrid vehicle 30, which has the active vibration control system 100 and the motor assistance regenerative controller 200, is basically constructed as described above. Detailed operation of the generator motor control apparatus 10 will be described below.

In FIG. 1, the frequency counter 32 detects a rotational frequency f of the crankshaft 110 from crankshaft pulses Ep, and supplies the detected rotational frequency f to the basic signal generator 12 and the reference signal generating circuit 20.

The basic signal generator 12 comprises a cosine-wave generator 34 for generating a cosine wave cos $\{2\pi(f,n)\}$ as a harmonic basic signal from the rotational frequency f and a sine-wave generator 36 for generating a sine wave sin $\{2\pi(f,n)\}$ as a harmonic basic signal from the rotational frequency f.

The adaptive notch filter 14 comprises an adaptive notch filter (first adaptive notch filter) 14A for being supplied with the cosine wave cos $\{2\pi(f,n)\}$ and an adaptive notch filter (second adaptive notch filter) 14B for being supplied with the sine wave sin $\{2\pi(f,n)\}$. The adaptive notch filter 14A outputs a control signal (first control signal) y1($n$), and the adaptive notch filter 14B outputs a control signal (second control signal) y2($n$). The adaptive notch filter 14 also has a combiner 38 for adding the control signal y1($n$) from the adaptive notch filter 14A and the control signal y2($n$) from the adaptive notch filter 14B to each other and generating a control signal y(n) representing the sum. The generated control signal y(n) has a certain phase and a certain amplitude.

The motor assistance regenerative controller 200 searches the stored map for a to-be-applied torque depending on vehicle state information, such as a throttle valve opening produced by the accelerator pedal, not shown, a vehicle speed, a gear shift position, a brake pedal depression, or the like. Generally, the throttle valve opening and the to-be-applied torque are proportional to each other.

After having calculated the to-be-applied torque, the motor assistance regenerative controller 200 searches a stored map for a field current value to be supplied to the rotor field coils based on the calculated to-be-applied torque and the rotational frequency f of the crankshaft 110 which has been calculated from the crankshaft pulses Ep supplied from the crankangle sensor 112. The motor assistance regenerative controller 200 supplies the field current value which has been searched for and the drive signal Sm(n) through the combiner 39 to the power controller 101.

The power controller 101 controls the field current of the generator motor 104 so that it is equal to the field current value represented by the drive signal Sm(n), and switches the transistors of the three-phase inverter circuit thereof to achieve a rotational speed represented by the drive signal Sm(n), thereby operating the generator motor 104 as a motor. In this manner, a static torque is applied from the generator motor 104 to the crankshaft 110 based on the drive signal Sm(n), and an inverse torque (dynamic torque) is applied from the generator motor 104 to the crankshaft 110 based on the control signal y(n).

The power controller 101 is supplied with the combined signal y(n)+Sm(n) which represents the sum of the drive signal Sm(n) and the control signal y(n).

The generation of the control signal y(n) will be described in detail below.

The reference signal generating circuit 20 comprises four corrective filters 41, 42, 43, 44 and two adders 46, 48.

The corrective filters 41, 43 have the characteristics ReH(f) of a real part of the transfer function H of the generator motor 104, and the corrective filters 42, 44 have the characteristics ImH(f) of an imaginary part of the transfer function H of the generator motor 104.

The transfer function H of the generator motor 104 can be determined by measuring or simulating the frequency characteristics (revolving field frequency) of the torque of the crankshaft 110 connected to the rotor with the magnitude of the field current being used as a parameter, while the engine 102 is being turned off.

Each of the characteristics ReH(f) of the real part of the transfer function H and the characteristics ImH(f) of the imaginary part of the transfer function H has its value variable depending on the rotational frequency f.

The corrective filters 41 through 44 have their respective gains adjusted by the rotational frequency f.

The adder 46 is connected to the output terminals of the corrective filters 41, 42, and the adder 48 is connected to the output terminals of the corrective filters 43, 44.

The adder 46 outputs a reference signal (corrective value) Cx(n) pertaining to the cosine wave cos $\{2\pi(f,n)\}$ to the filter coefficient updating means 22A. The adder 48 outputs a reference signal (corrective value) Cy(n) pertaining to the sine wave sin $\{2\pi(f,n)\}$ to the filter coefficient updating means 22B.

It can be seen from the connections of the reference signal generating circuit 20 that the reference signals Cx(n), Cy(n) are expressed by the following equations:

$$Cx(n) = \cos\{2\pi(f,n)\} \cdot ReH(f) - \sin\{2\pi(f,n)\} \cdot ImH(f)$$

$$Cy(n) = \cos\{2\pi(f,n)\} \cdot ImH(f) + \sin\{2\pi(f,n)\} \cdot ReH(f)$$

If both or either one of the reference signals Cx(n), Cy(n) is mentioned, it is referred to as a reference signal C(n).

The filter coefficient updating means 22A sets an updated filter coefficient Wx(n+1) as a new filter coefficient W(n)=Wx(n) in the adaptive notch filter 14A (n←n+1), and the filter coefficient updating means 22B sets an updated filter coefficient Wy(n+1) as a new filter coefficient W(n)=Wy(n) in the adaptive notch filter 14B (n←n+1).

The filter coefficient updating means 22A, 22B are supplied with the error signal e(n) and the reference signals Cx(n), Cy(n), respectively, and successively update the filter coefficient W(n) at each time n so that the error signal e(n) is minimized.

If the updated filter coefficient W(n+1) is represented by W(n+1)=W(n)+ΔW, then the updating value ΔW is expressed by ΔW=−μ·e(n)C(n) where μ represents a constant. Based on the reference signal C(n) and the error signal e(n), the updating value ΔW is calculated according to an adaptive algorithm (LMS algorithm) so that the square of the error signal e(n) is of a minimum value.

The control signal y(n)=Y1(n)+y2(n) is supplied to the power controller 101.

The power controller 101 controls the field current of the generator motor 104 such that the field current will have a value determined from the combined signal of the control signal y(n) and the drive signal Sm(n), and switches the transistors of the three-phase inverter circuit thereof with turn-on and turn-off signals therefor which are determined from the combined signal, thereby operating the generator motor 104 as a motor. In this manner, the generator motor 104 applies a static torque and an inverse torque to the crankshaft 110.

According to the present embodiment, as described above, the adaptive notch filter 14 outputs the control signal y depending on the harmonic basic signals which are generated from the rotational frequency f of the crankshaft 110 by the basic signal generator 12, and the combiner 39 combines the control signal y and the drive signal (a signal for applying a static torque) Sm(n) for the generator motor 104 with each other and supplies the combined signal through the power controller 101 to the generator motor 104. Furthermore, the basic signals are supplied to the corrective filters 41 through 44 having the transfer function H of the generator motor 104, and the corrective filters 41 through 44 output the reference signal C to the filter coefficient updating means 22. Based on the error signal e representative of a rotational speed fluctuation of the crankshaft 110 which is detected by the error signal detector 120, and the reference signal C, the filter coefficient updating means 22 successively updates the filter coefficient of the adaptive notch filter 14 to minimize the error signal e. The control signal y is varied depending on only the frequency component of the rotational speed fluctuation of the crankshaft 110. Therefore, in the motor-assisted hybrid vehicle 30 which uses the generator motor 104 to assist the output power of the engine 102 when it operates in a motor mode, the active vibration control system 100 is capable of suppressing a torque fluctuation of the crankshaft 110 in quick response to the torque fluctuation without detriment to the response of the static torque applied by the generator motor 104. Accordingly, the active vibration control system 100 can suppress vibrations of the motor-assisted hybrid vehicle 30 which are caused by intermittent explosions (combustions) in the cylinders of the engine 102.

Since only the frequencies relative to the rotational speed fluctuation of the crankshaft 110 are affected, i.e., an inverse torque is applied, under frequency-tracking adaptive control, the response of the static torque applied at frequencies ranging from 0 [Hz] to several [Hz] by the drive signal Sm(n) is not adversely affected even though the drive signal (motor assistance signal) Sm(n) and the control signal y(n) are combined with each other by the combiner 39 and the combined signal is applied to energize the generator motor 104 through the power controller 101.

In the active vibration control system 100 incorporated in the motor-assisted hybrid vehicle 30, the filter coefficient W of the frequency-domain adaptive notch filter 14 is updated for adaptive feed-forward control based on the error signal e representative of the crankshaft rotational speed fluctuation. Consequently, vibrations can be reduced at only a single frequency (a basic harmonic) as shown in FIG. 1 or only a plurality of frequencies (a basic harmonic+a higher harmonic). Therefore, the vibration reducing capability is increased without detriment to the follow-up ability of the static torque generated by the generator motor. As a result, the same level of vibration control can be achieved both when the accelerator pedal is depressed to a certain depth to achieve a constant throttle valve opening and when the accelerator pedal is depressed to varying depths to achieve varying throttle valve openings.

Figure 3:
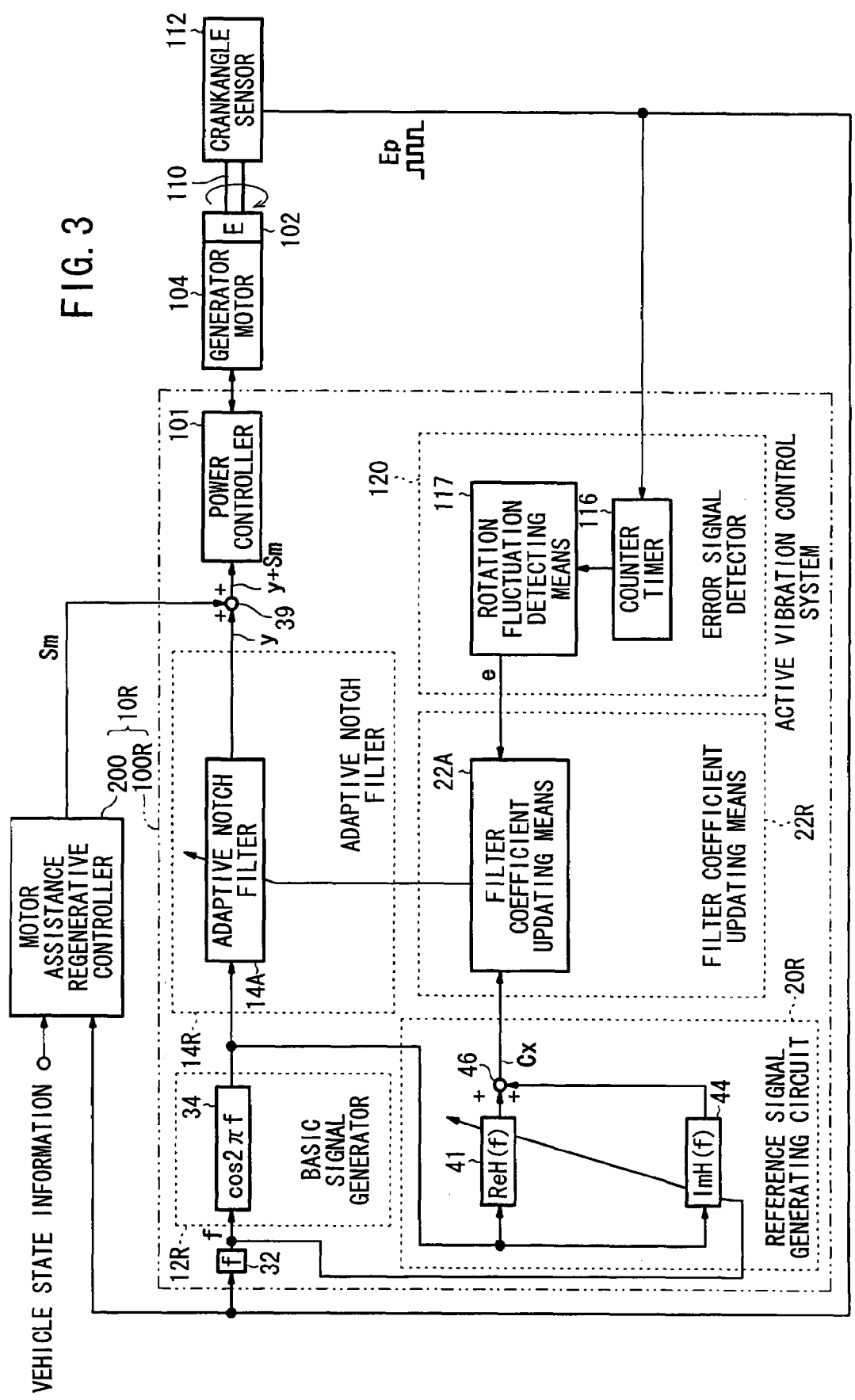
FIG. 3 is a block diagram of an electric arrangement of a generator motor control apparatus including an active vibration control system according to another embodiment of the present invention.

In the above embodiment, the basic signal generator 12 generates the cosine wave cos {2π(f,n)} and the sine wave sin {2π(f,n)}. FIG. 3 shows in block form a generator motor control apparatus 10R including an active vibration control system 100R according to another embodiment of the present invention. As shown in FIG. 3, the active vibration control system 100R has a basic signal generator 12R for generating only a cosine wave cos {2π(f,n)}. Though the active vibration control system 100R has a lower quick response capability and a smaller vibration control ability than the active vibration control system 100 shown in FIG. 1, the active vibration control system 100R offers its own advantages. The generator motor control apparatus 10R shown in FIG. 3 has a basic signal generator 12R, a reference signal generating circuit 20R, an adaptive notch filter 14R, and a filter coefficient updating means 22R which are made up of components whose costs are substantially one-half those of the generator motor control apparatus 10 shown in FIG. 1.

Although certain preferred embodiments of the present invention have been shown and described in detail, it should be understood that various changes and modifications may be made therein without departing from the scope of the appended claims.

What is claimed is:

1. An active vibration control system for use in a hybrid vehicle having a generator motor for assisting an engine in rotating a crankshaft thereof, comprising:
    a basic signal generator for generating a harmonic basic signal from a rotational frequency of the crankshaft;
    an adaptive notch filter for being supplied with said basic signal and outputting a control signal;
    a combiner for combining said control signal and a drive signal for said generator motor with each other and supplying a combined signal to said generator motor;
    an error signal detector for detecting a rotational speed fluctuation of the crankshaft and outputting an error signal representative of the detected rotational speed fluctuation;
    a corrective filter for being supplied with said basic signal and outputting a reference signal, said corrective filter having a transfer function of said generator motor; and
    filter coefficient updating means for being supplied with said error signal and said reference signal and successively updating a filter coefficient of said adaptive notch filter so that said error signal will be minimized,
    wherein the control signal effects only frequencies relative to the rotational speed fluctuation of the crankshaft, and the drive signal is representative of a motor assistance signal, and
    wherein the system suppresses a torque fluctuation of the crankshaft in response to the torque fluctuation without detriment to a response of the motor assistance signal.

2. A hybrid vehicle incorporating an active vibration control system according to claim 1.

3. An active vibration control system according to claim 1, wherein the drive signal for said generator motor is representative of a field current value and a rotational speed that correspond to a to-be-applied torque proportional to a throttle valve opening g.

4. A method of improving a vibration control capability of a hybrid vehicle having a generator motor for assisting an engine in rotating a crankshaft thereof, comprising the steps of:

generating a harmonic basic signal from a rotational frequency of the crankshaft with a basic signal generator;

multiplying a transfer function of said generator motor by said basic signal with a reference signal generating circuit to generate a reference signal;

detecting a rotational speed fluctuation of said crankshaft with an error signal detector to generate an error signal;

updating a filter coefficient of an adaptive notch filter so that said error signal will be minimized, based on said reference signal and said error signal, with filter coefficient updating means;

processing said basic signal with said adaptive notch filter to generate a control signal; and combining said control signal and a drive signal for said generator motor with each other and supplying a combined signal to said generator motor, wherein the control signal effects only frequencies relative to the rotational speed fluctuation of the crankshaft, and the drive signal is representative of a motor assistance signal;

whereby vibrations of said crankshaft is reduced to increase a vibration control capability of said hybrid vehicle, and whereby a torque fluctuation of the crankshaft is suppressed in response to the torque fluctuation without detriment to a response of the motor assistance signal.

5. A method of improving a vibration control capability according to claim 4, wherein the drive signal for said generator motor is representative of a field current value and a rotational speed that correspond to a to-be-applied torque proportional to a throttle valve opening.

* * * * *